(12) United States Patent
Lawrence (10) Patent No.: US 7,499,935 B2
(45) Date of Patent: Mar. 3, 2009

(54) SYSTEM AND METHOD FOR ENABLING ACCESS TO A DATA SOURCE THROUGH A GRAPHICAL INTERFACE

(76) Inventor: Casey J. Lawrence, 8860 S. Oak Hollow Cir., Sandy, UT (US) 84093

( * ) Notice: Subject to any disclaimer, the term of this patent is extended or adjusted under 35 U.S.C. 154(b) by 868 days.

(21) Appl. No.: 10/355,517

(22) Filed: Jan. 31, 2003

(65) Prior Publication Data

US 2004/0085363 A1    May 6, 2004

Related U.S. Application Data

(60) Provisional application No. 60/424,611, filed on Nov. 6, 2002.

(51) Int. Cl.
*G06F 17/00* (2006.01)
(52) U.S. Cl. .............................. 707/102; 707/3; 707/9; 707/100; 707/101
(58) Field of Classification Search ................. 345/418; 717/115; 715/500, 501.1, 512; 707/3, 100–102, 707/9
See application file for complete search history.

(56) References Cited

U.S. PATENT DOCUMENTS

| | | | |
|---|---|---|---|
| 5,953,427 A * | 9/1999 | Cordery et al. ............... | 380/51 |
| 5,953,724 A | 9/1999 | Lowry | |
| 6,092,075 A | 7/2000 | Carey et al. | |
| 6,134,706 A | 10/2000 | Carey et al. | |
| 6,154,750 A | 11/2000 | Roberge et al. | |
| 6,240,421 B1 | 5/2001 | Stolarz | |
| 6,307,574 B1 | 10/2001 | Ashe et al. | |
| 6,335,745 B1 | 1/2002 | Amro et al. | |
| 6,539,538 B1 * | 3/2003 | Brewster et al. ............ | 717/115 |
| 6,603,476 B1 * | 8/2003 | Paolini et al. ............... | 345/427 |
| 2002/0184202 A1 * | 12/2002 | Hara et al. ..................... | 707/3 |
| 2003/0187716 A1 * | 10/2003 | Lee ............................. | 705/10 |
| 2005/0114386 A1 * | 5/2005 | Nassor et al. ............... | 707/102 |

* cited by examiner

*Primary Examiner*—Sana Al-Hashemi
(74) *Attorney, Agent, or Firm*—Workman Nydegger (57) ABSTRACT

A system is provided for interfacing with at least one data source through a graphical interface. The system comprises a plurality of data view definitions to enable data display and manipulation for the data source as defined for each individual data view. A user environment index is included that represents descriptive information about a user who is accessing a data view. In addition, an access origin index is included that represents a location within the graphical interface from where a request was made to open a data view. A data set index is also included that represents a data set requested for a data view. An indexing engine is configured to generate an appropriate data view based on a relationship between the requested data set from the data set index, and an access location within the graphical interface from where the data view was requested as selected through the access origin index, and the descriptive information about a user as selected through the user environment index.

12 Claims, 3 Drawing Sheets

SYSTEM AND METHOD FOR ENABLING ACCESS TO A DATA SOURCE THROUGH A GRAPHICAL INTERFACE

This application claims priority to U.S. Provisional Application Ser. No. 60/424,611 filed Nov. 6, 2002.

FIELD OF THE INVENTION

The present invention relates to enabling access to a data source through a graphical user interface via a singular polymorphic engine.

BACKGROUND

Business enterprise software is computer software created to support the needs of most enterprise activities. Examples of enterprise software activities are functions such as accounting, shipping and receiving, billing, customer tracking and similar activities. The development of large-scale enterprise software has become a huge undertaking because of the complexity of the software.

Enterprise software development has evolved into a plateau of assorted development techniques. These software development techniques are mainly rooted in the approach of matching an enterprise activity or a group of common activities to one or more computer instructions called programs. These programs are usually stored on a data storage device such as a hard disk associated with a computer system. Programs can be extracted and loaded into a computer's memory to perform and/or support specific enterprise activities. The purpose of these programs is to specifically address one or more enterprise activities.

Usually one program or group of programs is intended to address one or more related enterprise activities. For example, if an enterprise wants to enter and maintain customer information on a computer system, a program or a set of programs must be developed to support this specific activity. Thus, one or more programs may be required to support the customer entry and maintenance activity.

To address enterprise activities and processes, the software development industry uses multiple techniques in the development of enterprise software. The following list describes some typical software development techniques used by the enterprise software development industry. These techniques may include:

1. Developing a full set of enterprise applications consisting of many programs, where each program is uniquely designed to generally match one enterprise activity.
2. Developing and/or using a set of reusable programs, sometimes referred to as a framework. Using these reusable programs as building blocks allows an enterprise to develop and support more sophisticated programs for enterprise activities.
3. Generating and storing a program or a set of programs using software generation tools. These tools may be referred to as Computer Aided Software Engineering (CASE) tools. Enterprises may further refine or extend these generated programs to support an enterprise activity or group of related enterprise activities.
4. Developing applications using high level computer languages like query languages or fourth generation languages to match programs with enterprise activities.

The enterprise software development industry currently uses one or more of these development techniques to create enterprise software applications.

There are generally two trends in the software development industry. One trend is the development of software programs using reusable software programs, methods or components. This reusable software is often developed for repetitive user interface and data processing activities. Another trend is the use of software development tools, which generate programs. These trends have reduced the volume and size of some programs, but have added complexity to the programming environment. This complexity comes from the complicated nature of frameworks, CASE tools and the management of reusable programs.

Regardless of these trends or the computer languages used, the need to match a program or programs to a specific activity is still the central element in nearly all enterprise software applications today. Due to the number of enterprise activities, there are an overwhelming number of programs. The storing of customer information is just one of thousands of enterprise activities requiring specifically written programs. The number of possible enterprise activities requiring automation is growing at an exponential rate.

As a result, there has been a growing enterprise software crisis. This crisis is due to the increasing difficulty of developing software fast enough to keep pace with enterprise demands and the confusion and complexity created from the ever-changing and developing computer methodologies and technology. This crisis is characterized by the complexity, persistent defects and the cost overruns involved in maintaining and modifying the vast and interrelated software programs developed for business enterprises.

At the core of the enterprise software crisis is the volume, size and complexity of programs packaged into software applications. Since the number of enterprise activities may continue to increase, so will the number of programs. To complicate matters even further, the computer industry is exponentially adding more computer languages, software tools, methodologies and applications to address all of the required enterprise activities and processes.

Most enterprises acquire multiple software applications to address all of their activities. This means most enterprises must maintain multiple software applications. Each software application may be written in multiple computer languages utilizing multiple development tools with thousands of programs. The challenge is to understand, integrate and maintain all of these software applications. Today most enterprises must understand multiple operating environments, computer languages, databases, development tools and software applications—an overwhelming task for any enterprise. All of this continues to complicate, confuse and increase the expense of automating an enterprise. The result is software overload and excessive costs.

The following list highlights some of the software overload problems:

1. Software Repetition. Most software applications contain programming repetition for user interfaces data retrieval, relational connections, data validations, data processing and the display of data and/or objects. Programming repetition is where the same computer instruction(s) is repeated and stored in more than one program. The object-oriented programming methodology was designed to address this concern by compartmentalizing and reusing software. The object-oriented industry and various software development tools have tried to alleviate this problem, but with limited success mainly due to the difficulties involved with communicating between objects. The volume, size and complexity of programs under the surface of most applications is still overwhelming and unnecessary because of software repetition.

2. Inconsistent User Interfaces. User navigation systems and interfaces vary significantly within most enterprise software applications. Most older enterprise software applications already had significant variations between automated activities. To make matters even worse, the race to a graphical user interface (GUI) followed by the Web industry has resulted in even more user navigation systems and interfaces. This has resulted in confusion at the user level because of the volume of ways to view, enter, and maintain data. Inconsistent user interfaces and navigation differences increase the length of time to learn and implement software applications. To alleviate this problem, the software development industry is using development tools, frameworks, programming standards, software development methodologies, and development discipline. Regardless of all of these efforts, inconsistent user interfaces and navigation systems will persist because every developer is independent and unique. This means the variations will continue to multiply.

3. Rigid Software. Most software applications are rigid and difficult to enhance, alter or customize. Because of the size and complexity of software applications, the customization or enhancement of these applications is an expensive and difficult process. The software industry has found it difficult to provide a software application with every possible enterprise activity for every enterprise. In addition, a software application with every possible enterprise activity involves a massive software application, which is the direction and problem of the enterprise software industry today. The current trend in the enterprise software industry is to require users to adapt to the software application business processes because of the danger and complexity of altering the software. However, each enterprise will continue to have unique activities and will continue to desire to support these activities by altering or enhancing the software.

4. High Cost and Effort to Upgrade Software. Due to the volume, size and complexity of most software applications, the upgrade process is difficult, time consuming, costly and disruptive to business. Added on top of this is the complexity of customizing and enhancing the software, which adds additional complexity when upgrading software applications. The cost and effort to upgrade software applications is so large and disruptive, some enterprises will avoid an upgrade as long as possible and choose to be without support.

5. Technology Catch-Up. The computer software industry has undergone a tremendous amount of change. The industry has gone from character, client-server, GUI, to the Web in a relatively short period. Because of the volume, size and complexity of most software applications, the development efforts to keep up with an ever-evolving technology are prohibitive or very costly. Some software companies have kept up with the rapid change, but have unstable products due to the rapid re-write and re-deployment of their products. This instability along with the costs to re-write software applications are passed on to the consumer. Many enterprises spend excessive time and money debugging and stabilizing the buggy products they use in order to survive. Quality and cost will continue to suffer in this race.

6. Software Scalability. Smaller enterprises or businesses cannot afford to purchase and implement large software applications. The volume, size and complexity of large software applications, requires too many resources. Instead, smaller software applications are selected with limited functionality. However, these smaller software applications do not have the functionality or resources to address all possible future enterprise activities and technology requirements. Also, smaller software application developers do not have the resources to keep up with the industry. When an enterprise grows or the computer industry changes, companies must throw out smaller and/or obsolete software applications just to keep up with technology and its own needs. This process is expensive and disruptive to business.

A significant part of these problems is the varying design and communications between programs. The lack of discipline and standards in the enterprise software development industry is also a problem. Regardless of the number of standards and the level of discipline, the fact will always remain—the approach, method, output, structure and communication between programs will always vary between developers. Since each developer is unique, the programs created by different developers will be unique. Communication can be difficult between co-workers on simple matters, and this effect is often amplified between software developers on more complex technical matters. Therefore, the required communication and output for a program will always vary between developers. Communication will continue to be a large issue in the problems listed above. None of the problems discussed above can be resolved unless there is a new approach to software development and deployment.

SUMMARY OF THE INVENTION

A system is provided for interfacing with at least one data source through a graphical interface. The system comprises a plurality of data view definitions to enable data display and manipulation for the data source as defined for each individual data view. A user environment index is included that represents descriptive information about a user who is accessing a data view. In addition, an access origin index is included that represents locations within the graphical interface from where a request was made to open a data view. A data set index is also included that represents a data set requested for a data view. An indexing engine is configured to generate an appropriate data view based on a relationship between the requested data set from the data set index, and an access location within the graphical interface from where the data view was requested as selected through the access origin index, and the descriptive information about a user as selected through the user environment index.

Additional features and advantages of the invention will be apparent from the detailed description which follows, taken in conjunction with the accompanying drawings, which together illustrate, by way of example, features of the invention.

DETAILED DESCRIPTION

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention can be described generally as a unified software system capable of providing both the development and execution of enterprise applications. The system of the present invention includes nearly all software development and end-user enterprise activities. The system provides a rigid development environment, but the system is fluid and flexible in addressing all possible enterprise activities. This type of software system may be referred to as singular polymorphic software or unified polymorphic software. A singular polymorphic software system includes a unified set of computer programs written to contain a large number of dynamic functionality options.

Figure 1:
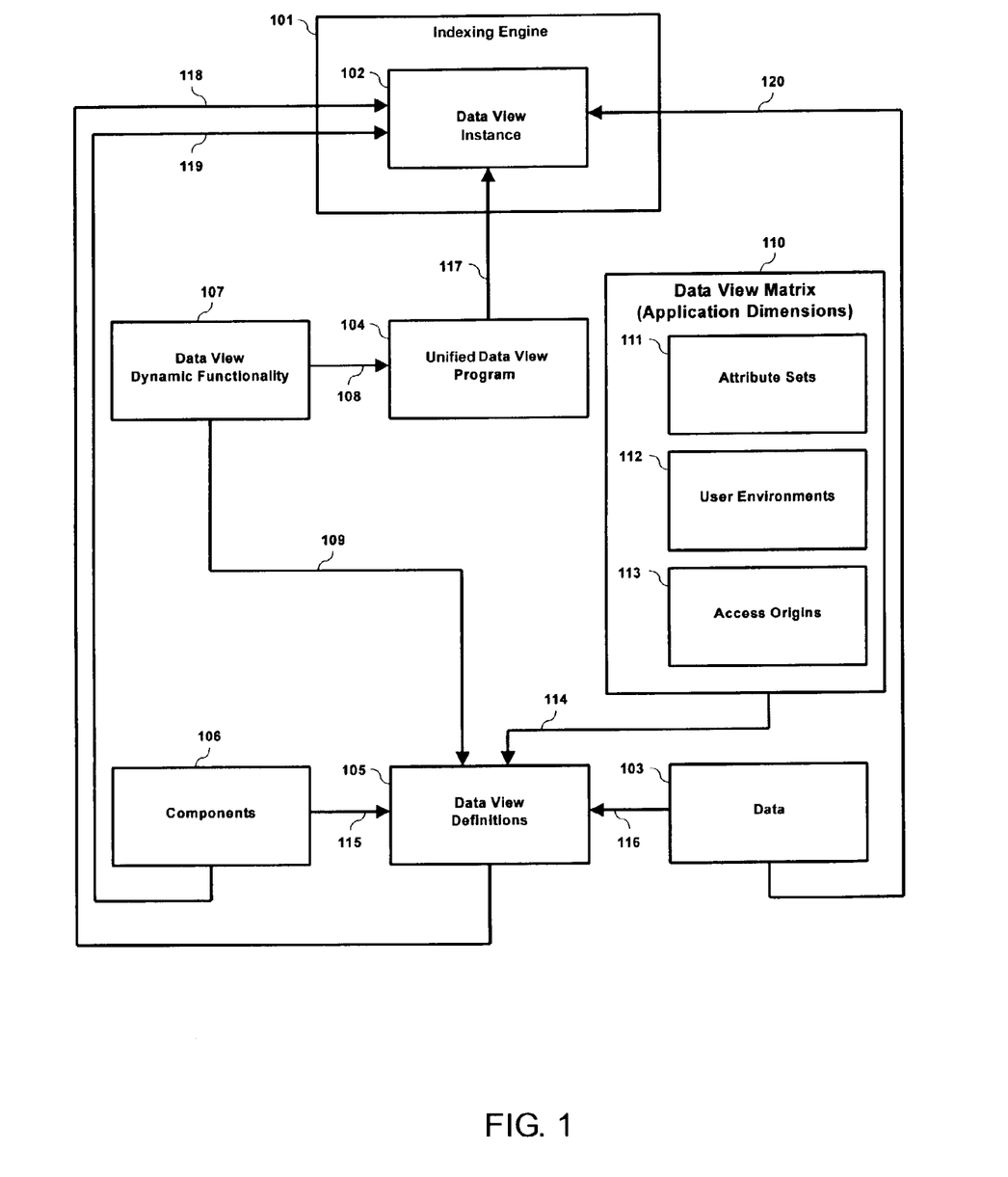
FIG. 1 is a block diagram illustrating an embodiment of a system for enabling access to a data source through a graphical user interface via a singular polymorphic software engine.

The present invention includes a graphical user interface operating within one or more computer systems or computer servers. FIG. 1 illustrates an indexing engine 101 to provide the user with the ability to define, initiate, operate and manage a plurality of interactive graphical objects called data view instances 102. Each data view instance can include an instantiated data view. A data view instantiation includes an interactive graphical data presentation and data maintenance device operating within the indexing engine. A data view instance can combine both data and computer instructions into an interactive graphical object for an enterprise development or application activity. Data 103 is any information stored on a non-volatile computer storage device or existing within the volatile memory of any computer supporting the enterprise application and development environment.

All data view instances can be derived from a single unified program or set of programs called the unified data view program 104. The unified data view program can be designed to address nearly all enterprise application development and enterprise application activities. Each data view instance will be a copy or partial copy of the unified data view program and may be referred to as simply a "data view". Each data view instance can correspond to one or more data view definitions 105. Data view definitions define the display, layout and operation of one or more data view instances.

Components 106 are included in the embodiment of the present invention. Components are computer instructions used for the support of enterprise application and enterprise application development activities. The main purpose of components is the creation, maintenance, manipulation and deletion of data.

All data views can have the same common functionality and potential dynamic functionality 107. Common functionality refers to any data view feature, which cannot be altered by the user of the invention and is provided to all data view instances. Common functionality can be included in the unified data view program 104 and provided to all data view instances. Examples of common functionality might be scroll bars, navigation, help, etc. Dynamic functionality refers to any data view feature that may be selected, initiated, defined or altered by the user when defining a data view. Dynamic functionality can be programmed into the unified data view program 108, but may optionally be provided to all the data view instances. Examples of dynamic functionality are data view layout, position, data selection, data sort, computer instructions, events, etc. When and how dynamic functionality will be related 109, defined and activated for a particular data view is defined within the data view definitions 105.

A multi-dimensional matrix concept called the data view matrix 110 can be used when defining dynamic functionality for data views. The data view matrix includes an index to the data views based on a plurality of matrix dimensions or application dimensions. An application dimension is a set of modifier incidents, which may be used when defining the dynamic functionality of a data view. Modifier incidents refer to any information or activity accessible to the computer system or computer network where the invention resides. Modifier incidents may include any data, computer instruction, system environment definition or any navigation or activity performed by a user, which may be used to define or alter a data view definition. The data view matrix 110 consists of at least three application dimensions. These three application dimensions are: Attribute Sets 111, User Environments 112, and Access Origins 113. An alternative embodiment of the invention may use just two application dimensions but the use of just two application dimensions does not provide all the benefits provided by using three or more application dimensions.

The attribute set dimension 111 refers to a group of related attributes used to support one or more enterprise activity. Attribute refers to a property that can assume data values for an entity, concept or relationship. An attribute, as it relates to the present invention, refers to a data label, which corresponds to a data column within a data view. An attribute set can be used to define one or more data views, where each data view must relate to at least one attribute set. For example, an attribute set called "Customer Master" may be defined with the attributes "Customer Code", "Customer Name", "Customer Address", "Customer Price List", etc. An attribute set with one set of data values within each attribute will be referred to as a record. A data view may display one or more records. When the term "dimension" is used in this disclosure, this can include the use of an index to data views that represents the specific dimension.

The user environment dimension 112 refers to any information within the software system that defines the user access, for example: name, position, site, company, division, department, location, entity, etc. This access information may also include any environmental information relating to the user, for example: computer hardware, network, operating system, system architecture, etc. A user may be any person accessing the software system, for example: end-user, system administrator, developer, etc.

The access origin dimension 113 refers to any point or area of origin within the indexing engine or data view instance from which a particular data view instance is initiated. This might be any area or point where the user has access from within the graphical user interface of the invention as it relates to initiating a data view instance. For example: menus, icons, tool bars, another data view instance, attribute, attribute set, attribute type, data value, data type, record, column, column group, etc.

A data view definition 105 is constructed by selecting 114 one or more modifier incidents from any of the application dimensions 111, 112 and 113 and by selecting 109 and defining the dynamic functionality 107 to be activated or implemented when initiating a data view instance 102. Components 106 may also be selected 115 when defining dynamic functionality. For example, a component containing the computer instructions to validate a new "customer number" may be selected. In addition, data 103 may be occasionally selected 116 and used when defining dynamic functionality. For instance, a "user-id" can be used when defining the access permissions of a particular data view instance.

The main process of creating a data view instance 102 begins with a user request for one or more data views from within the indexing engine 101. The indexing engine can select 118 the appropriate data view definitions 105 based on either an exact data view definition or composite of data view definitions based on the current modifier incidents.

The data view definitions define the layout and operation of the data view along with the definition of the data and components. A data view can be generated by using a copy or partial copy of the unified data view program 104 and loaded 117 into one or more computers for display and operation using the indexing engine 101. The data view dynamic functionality 107 can be activated or implemented as defined to the data view definitions. The process can select 120 the data 103 as prescribed by the data view definitions 105, the selection 119 of the components 106 as also defined by the data view definitions 105, and the selection of other information as needed to create and display the data view instance using the indexing engine 101. The data 103 selected 120 within a data view instance 102 will be referred to as a data set. The data set may contain data and attribute definitions accessible to the user from within. a particular data view instance.

An embodiment of the invention includes an enterprise application development environment that can be deployed through the indexing engine 101. The development environment can define data views and may include the definition of product operation and system architecture. The data view definition process involves defining, combining, and relating attributes, attribute sets, components, application dimensions, modifier incidents and dynamic functionality together into data view definition.

The development environment may use data views to define data views. This way the invention software system can be expanded using existing data views. This is comparable to inheritance in other software systems but it can be more accurately described as expansion of the data views to create other data views. The approach of a single unified program or programs for all data views and using these data views to define other data views provides a powerful but simplistic straightforward approach to software development. This concept helps reduce the size and complexity of the enterprise applications and development environment, as well as improving consistency and simplifying the enhancement, customization and upgrade process.

The present invention also includes an enterprise application environment for execution of the application using the indexing engine 101. Enterprise application activities can be performed using data views, where one or more data views may be defined to support one or more enterprise activity or application.

The present invention helps address the problems discussed previously as follows:

1. Software Repetition. The present invention is a single system encompassing nearly all user activities by providing consistent navigation and functionality applied uniformly across all data presentations. This helps eliminate the need for creating and managing a multitude of separate programs.
2. Inconsistent User Interfaces. The present invention provides development and enterprise application activities through the use of a single, unified data presentation and data management system with a large number of variations available within a graphical user interface. This provides one user interface for all activities within the system resulting in a significant time reduction for training users when learning the navigation and functionality of the device.
3. Rigid Software. The present invention provides a fluid presentation of data. Significant changes to functionality may dynamically change based on navigation, data, and environmental conditions defined within the system. Simple and quick additional definitions and/or adjustments within the development environment of the present system results in significant changes to the presentation, management and processing of data. New functionality can be added quickly and efficiently, which eliminates a rigid software environment by providing a truly fluid and dynamic environment.
4. High Cost and Effort to Upgrade Software. The present system and method eliminate the need to match a program or set of programs to support an enterprise activity. Since one unified set of programs is used for nearly all user activities, upgrades and enhancements to the product can be greatly simplified. This means only a single product needs to be upgraded. Also, the invention stores a majority of its computer instructions within a database device, this way the separation and identification between original and custom functionality can be quickly identified, thus eliminating the high cost and effort to upgrade. In other words, all of the application and most of the software components (computer instructions) will be stored within a database device instead of in a raw executable format on a storage device. This way the indexing and location of components is consistent with the indexing and storing of the data and the components may be used to select and compare other components all within the same database. This improves upgrades and provides consistency.
5. Technology Catch-Up. Another advantages of the present system and method is its versatility when technology changes. Since the present invention is basically a single, uniform software device, adding new functionality naturally applies to all activities. This means when technology changes and new functionality is required, only one unified software system needs to be altered. Changes to the presentation and functionality do not affect the enterprise assets. The enterprise assets can be retained and rarely affected by changes to the core system.
6. Software Scalability. Since the present invention consists of a single, unified software device, with the capability of either a centralized or distributed processing architecture, the operational requirements may start out very small and grow significantly as additional enterprise activities are addressed. This is due to the compact size of the system. Adding more enterprise activities will not require the addition of more programs. This means an enterprise can start using the present invention without a significant investment in computer resources.

Some software applications have attempted to centralize and unify development as well as end-user activities into a framework or CASE Tool. Unfortunately these programs still fall short of a truly unified and comprehensive approach. The present invention provides more independence from operating environments, computer languages and databases through a single, unified, fluid data maintenance device.

Now that a high level description of the invention has been provided, a more detailed description of each portion of the invention will be described.

Attributes

Attributes are one of the building blocks used within the invention. The term "attribute" is generally defined here as a label associated with a package of common information. The information labeled by an attribute is a small package of information for an enterprise and will be referred to as "data"

(plural) or "data value" (singular). The smaller element of data is referred to as a "data value". The term "data" as it pertains to this invention refers to any information either stored within a computer's memory or on a nonvolatile computer storage device. This data can include variables, text, numbers, dates, values, references, links, objects, documents, graphics, multi-media files, etc.

An attribute may correspond to a column of data displayed within a graphical user interface of the invention. The graphical user interface of the present invention will be referred to as the indexing engine. A column refers to a list of data with the same attribute name within a data view instance. An example of a column would be a list of customer names under the "Customer Name" attribute within a data view instance. All attributes in an enterprise application can be defined within the indexing engine. An example of an attribute might be "Customer Name". A list of data with the same attribute name makes up a column. Attributes may be combined into compound attributes where multiple attributes might make up a single compound attribute.

Figure 2:
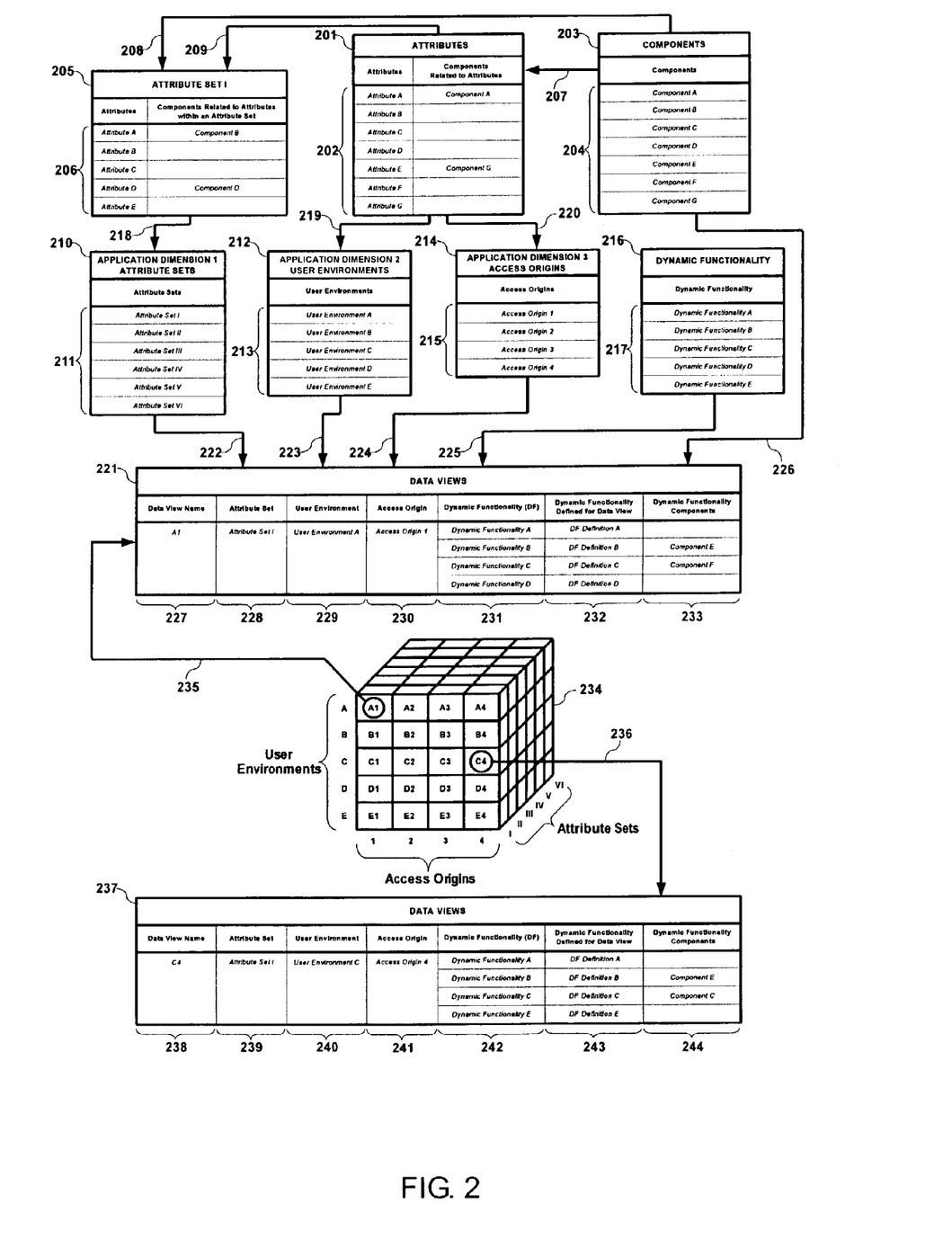
FIG. 2 is a flow chart illustrating processes, functions, data view matrix dimensions, and dynamic functionality for defining data views in an embodiment of the invention.

FIG. 2 illustrates a representation of attribute definitions 201 with a defined number of attributes 202 required for an enterprise application. Attributes may be classified, grouped, indexed and labeled. Attributes may be classified into "attribute types" (sometimes referred to in the computer industry as "data types"). Attributes may also be related to other attributes. Each attribute may be associated to one or more names and/or labels.

Figure 3:
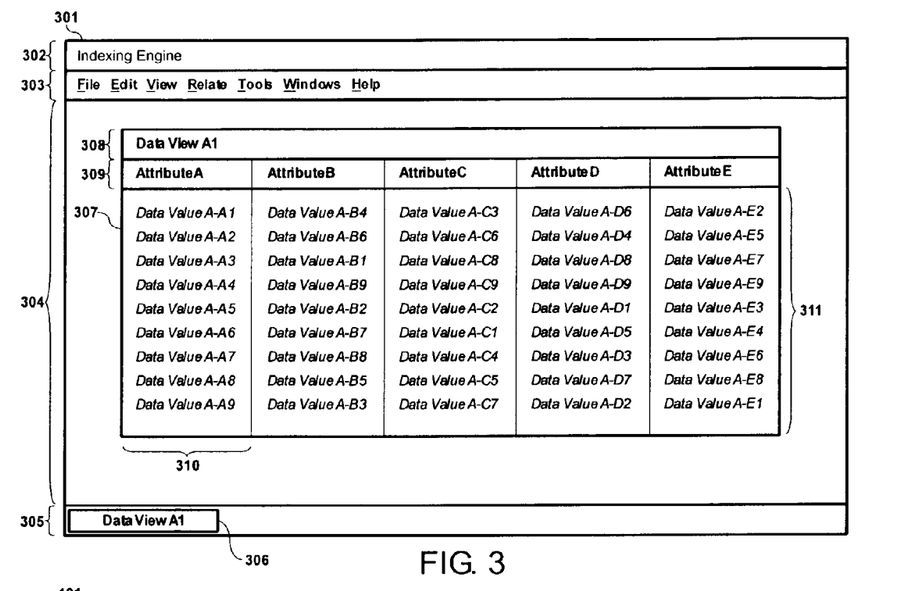
FIG. 3 illustrates an embodiment of a single data view (A1), as in FIG. 2.

FIG. 3 illustrates a representation of common data values 310 for an attribute (Attribute A) within a data view 307, which will be referred to as a "Column" of data. An example of an attribute might be called "Customer Name". The "Customer Name" may be labeled, classified, indexed, and related to other attributes, for example, the "Customer Address".

The definition and maintenance of attributes along with the classification, grouping, indexing and labeling of attributes, can be performed within the indexing engine and stored on a computer storage device.

Components

Components are also building blocks used within the present invention. The term "component" in this description refers generally to a single pre-defined storage location containing computer instructions (often referred to as procedures). The procedures refer to a single, set or sequence of instructions to a computer indicating how a particular task or group of tasks should be performed. This includes methods, procedures, logic, instructions, etc. The component is the smallest possible package of procedures.

The component is a building block of data manipulation within the invention. A component may be as simple as an attribute default or may be as complicated as a customer merge process. Each component may have one or more names and/or labels. Components may be related to any activities within a data view instance. Components may be defined for a specific data view definition or may be used for multiple data view definitions. Components can be used within the invention to provide modular programming.

Components can be classified and grouped. Components may also be related to other components. The procedures within a component are usually written in a computer language. The procedures within components are mainly for the purpose of manipulating, creating, modifying, deleting, validating or defaulting data.

FIG. 2 illustrates a representation of component definitions 203 with a defined number of components 204 in an enterprise application. Components may be related 207 to one or more attributes or directly related 226 to a data presentation or data view 221, 237. FIG. 2 further illustrates the relationship between a component and an attribute 201 (Component A to Attribute A and Component G to Attribute E). Although FIG. 2 illustrates the relationship between a single attribute and a single component, multiple components may be related to one attribute. Components related to attributes can be a global relationship, but may be overridden as needed.

An example of a component is a procedure for validating a new and unique "customer code". The component may be labeled as the "customer code validation" and classified as a "code validation" component. Components may be related to other components. For example, the "customer code validation" may be related to the "default customer code" component. Components and attributes can be globally or locally related together. For example, the "customer code validation" may be related to the "customer code" attribute.

The definition and maintenance of components, along with the classification, grouping, relationship and labeling of components, can be performed within the indexing engine and stored on a computer storage device.

Attributes Sets

An Attribute Set is a group of one or more pre-defined attributes. An attribute set defines the data set or columns of data within a data view. The data set is the data selected, displayed and accessible to a user within a data view. The definition of attribute sets can be performed within the indexing engine. FIG. 2 illustrates a representation of an attribute set definition 205 called "Attribute Set I". An attribute set consists of a selected group of attributes 206, from the attribute definitions 202. Pre-defined attributes 201 are selected 209 and organized into a set of attributes 206, which makes up an attribute set. Illustrated within FIG. 2 is the definition of an attribute set called "Attribute Set I" by selecting Attributes A through E 206 from the pre-defined Attributes A through G within the attribute definitions 201. An example of an attribute set might be the customer master attribute set comprising the attributes of customer code, customer name, customer address, customer class, price list, A/R Terms, etc. Any combination of related attributes 202 may be combined into an Attribute Set 205. Unlimited attribute sets may be defined within the indexing engine.

FIG. 2 illustrates the relationship 208 between an attribute set 205 and components 203. Attribute and component relationships may be defined differently within attribute sets by overriding the original attribute and component relationship as defined within the attribute definitions 201. An example of overriding an attribute component is illustrated in FIG. 2 where Component A is related to Attribute A within the attribute definitions 201, but is overridden by Component B in Attribute Set I 205. This is only an example of how attribute components may be overridden, but additional components may be added building a compound number of components related to a specific attribute within an attribute set, which is not illustrated in FIG. 2.

FIG. 2 also illustrates the concept of uniquely relating components to attributes within an attribute set, where Component D is related to Attribute D within Attribute Set I 205. FIG. 2 also illustrates an example where a component is related to an attribute without being overridden within the attribute set definition. This is shown within attribute definition 201 where Component G is related to Attribute E and is not overridden in Attribute Set I 205 for the same Attribute E, therefore leaving the component and attribute relationship definition within the attribute definitions.

Another example of an attribute and component relationship is where a specific component contains a validation procedure for a specific attribute, but the original component may be replaced by another component with different validation procedures for a specific attribute set for the same attribute. Alternatively, a component with additional validation procedures may be added to the same attribute for a specific attribute set adding additional validation procedures. This way, component procedures may be unique, replaced or compounded for attributes when defining attribute sets. The definition and maintenance of attribute sets can be performed within the indexing engine and stored on a computer storage device.

Application Dimensions and Data View Matrix

A valuable part of the present invention is the Application Dimension. FIG. 2 illustrates the definition of three (3) application dimensions: Attribute Sets 210, User Environments 212, and Access Origins 214. These three application dimensions help drive the basic operation of the invention. An application dimension contains a group of modifier incidents. An modifier incident can be any attribute, attribute set, data view, user activity, data value, point within the indexing engine, or any environmental information within the invention, computer, or network where the present invention operates. Modifier incidents may also be specific activities within the present invention, such as navigation activities. The number of modifier incidents defined within an application dimension, may be fixed or unlimited and may be either pre-defined or defined by the users of the present invention.

FIG. 2 illustrates an example of modifier incidents 211, 213 and 215 defined for each of the three application dimensions. Each application dimension defines one side of a multi-dimensional matrix 234 used to define the dynamic functionality of a data view. Dynamic functionality drives the layout, format, operation and maintenance capabilities within a data view. The multi-dimensional matrix 234 is referred to as the data view matrix.

The data view matrix 234 is a multi-dimensional concept within the body of the present invention, which helps understand how the invention defines data views and how the data views operate. The three application dimensions are the base (or minimum) application dimensions, which are necessary for the operation of the present invention. More application dimensions may be defined beyond the three illustrated application dimensions. However, only the three application dimensions as illustrated in FIG. 2 will be discussed for the sake of simplicity in explaining the application dimension concept within the body of the present invention. Two application dimensions can also be used in certain implementations of the present system and method.

FIG. 2 illustrates a representation of the "Attribute Set" Application Dimension 210, which is one side of the data view matrix 234. Defined within the attribute set application dimension are modifier incidents 211. Attribute set application dimension modifier incidents can be comprised of pre-defined attribute sets. Attribute sets are defined 205 and related 218 to the attribute set application dimension 210. FIG. 2 illustrates the relationship between attribute sets and the attribute set application dimension where Attribute Set I 205 is defined as an attribute set and related 218 to the attribute set application dimension 211. FIG. 2 also illustrates multiple attribute sets 211 that have also been defined and related to the attribute set application dimension 210. The definition of attribute set application dimensions 210 can be performed within the indexing engine and stored on a computer storage device.

FIG. 2 illustrates a representation of the "User Environment" Application Dimension 212, which is the second side of the data view matrix 234. Within the user environment application dimension 212 are the defined user environment modifier incidents 213. These modifier incidents 213 represent environmental information or definitions about users who may access the system. Examples of user environment modifier incidents may be user ID, user position, title, department, division, company, client computer type, location, port, installation, etc. A user environment modifier incident 213 may also be a combination or compound of other user environment modifier incidents, for example, a specific user ID within a specific division in a specific company, etc. These modifier incidents may be related to attributes 219 from the attribute definitions 201, any data value within an attribute column, or any system environmental information (referred to as user environment modifier incidents). The user environment modifier incidents 213 may not be limited to the defined attributes 202 or attribute data values. User environment modifier incidents 213 may be related to any user who may access the invention. The purpose of the user environment modifier incidents 213 is to provide a means or mechanism to dynamically alter the functionality or layout of any data view instance within the indexing engine based on the user environment modifier incidents. Unlimited user environment modifier incidents 213 may be defined within the indexing engine and stored on a computer storage device.

FIG. 2 illustrates a representation of the "Access Origin" Application Dimension 214, which is the third side of the data view matrix 234. Within the access origin application dimension 214 are access origin modifier incidents 215. These modifier incidents 215 represent specific points or areas within the indexing engine where a user of the invention may access, launch or initiate a specific data view instance. Examples of access origin modifier incidents might be a menu, data view, attribute, attribute data value, attribute type, column, icon, tool bar option, etc. Access origin modifier incidents 215 may be a combination or a compound of access points, for example, a specific data value within a specific attribute, within a specific data view instance, etc.

The access origin application dimension modifier incidents 215 may be related 220 to an attribute from the attribute definitions 201, a data value defined for an attribute, or any point or area of the indexing engine from which a user of the invention may access a data view. These access origin modifier incidents 215 are not limited to the defined attributes 202 or even attribute data values. Each of the defined access origin modifier incidents 215 can relate to any point or area where a user of the present invention can access a data view from within the indexing engine. The purpose of the access origin modifier incidents 215 is to provide a means or mechanism to dynamically alter the functionality or layout of any data view instance operating based on the point the data view instance was accessed by a user within the system. Unlimited access origin application dimension modifier incidents 215 may be defined within the indexing engine and stored on a computer storage device.

Application dimensions are a valuable concept that help drive the functionality and operation of the present invention. As mentioned earlier, additional application dimensions may be defined and made available to the operation of the present invention. However, the Attribute Set 210, User Environment 212, and Access Origin 214 may be considered as the minimum and base application dimensions of the invention.

The advantage of using dimensions over the prior art is that application dimensions help provide the means to define the dynamic functionality of all data views. Application dimensions provide at least two advantages. First, application dimensions provide the resources to define data view dynamic functionality. Second, application dimensions simplify the data view definition process by defining common dynamic functionality for multiple data views that share common application dimensions, thus eliminating the need to match a data view definition for each and every possible data view within the data view matrix.

Dynamic Functionality

The term "functionality" is used in the present invention to refer to the display, layout, user navigation, and operational features available for an interactive presentation of the data view operating within the indexing engine. Functionality can provide the user with the capability to view, create, maintain, delete and manipulate data and procedures. Examples of functionality may be on-line help, scroll-bars, data access, data position, data format, data selection, data sorting, etc.

There are two types of functionality in the present invention: common functionality and dynamic functionality. Common functionality refers to any feature, characteristic or capability involved with the viewing or manipulation of data and procedures common to all data views. Common functionality does not dynamically change and cannot be altered by the user. For example, on-line help and scroll-bars are examples of common functionality because these features can be provided to all data views. The user cannot alter, modify or define common functionality within the indexing engine. Common functionality can be programmed into the unified data view program.

Dynamic functionality refers to features, characteristics or capabilities involved with the viewing or manipulation of data and procedures, and may be manually or dynamically altered for a data view instance. In addition, dynamic functionality may be defined to be dynamically activated, implemented, changed, blocked, modified or made available based on certain conditions defined by the user within the indexing engine. Examples of dynamic functionality are data format, data layout, data sort, data access, and data selection, which may vary based on certain conditions selected or defined by the user.

FIG. 2 illustrates a list 217 of dynamic functionality 216. The user of the present invention cannot create dynamic functionality, but it can be programmed into the unified data view program. Dynamic functionality may be related to attributes 201 and attribute sets 205. Dynamic functionality is a valuable element of the present invention that provides the fluid and dynamic nature of this system.

Data Views

The data view is programmed to operate within the indexing engine. All data views can be derived from one unified program or set of programs called the unified data view program. The unified data view program can be replicated and used in a computer's memory with varying dynamic functionality based on one or more data view definitions. A copy of the unified data view program operating within the memory of a computer can be referred to as a data view or more specifically a data view instance. A data view instance provides a graphical presentation of data coupled together with procedures for the purpose of viewing and maintaining data.

Included within the unified data view program is the capability to perform nearly all enterprise application development and enterprise application activities. This includes nearly all the necessary activities to view and manipulate data and procedures. Data views may also be used to define additional expanded or child data views within the indexing engine. Both the enterprise application development and enterprise application execution capabilities of the present invention are mainly provided through the use of data views. This means both development and applications may operate using the same functionality within the same indexing engine. This is how the invention provides both an enterprise application development environment as well as an enterprise application environment.

FIG. 2 illustrates two exact data view definitions: A1 221 and C4 237. An exact data view definition is created by selecting an modifier incident from each of the application dimensions and selecting and defining dynamic functionality for a specific data view. Data view A1 221 is an exact data view definition because all three of the application dimensions are defined 228, 229 and 230.

Figure 4:
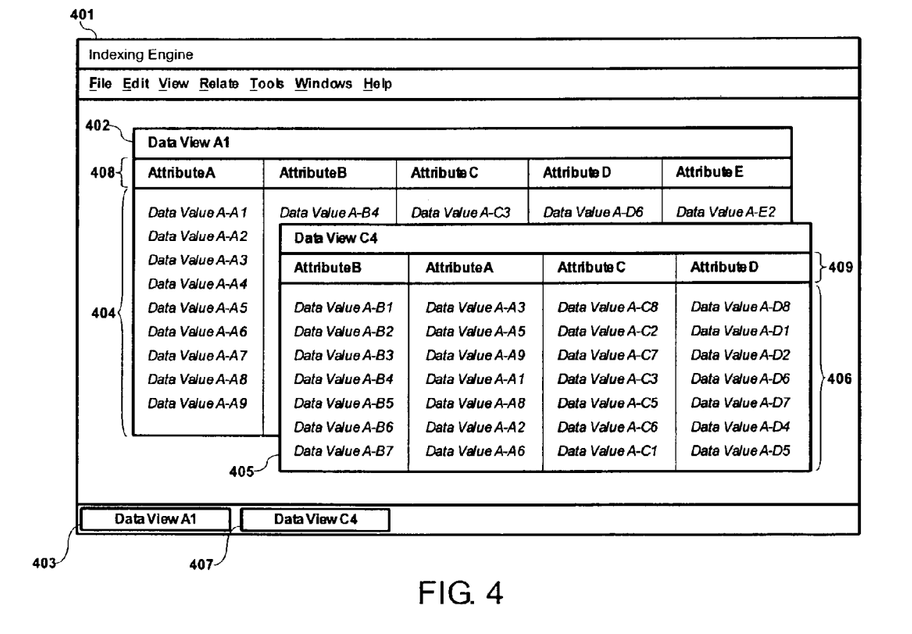
FIG. 4 illustrates two data views (A1 and C4), as in FIG. 2, where both data views have a common attribute set as in an embodiment of the present invention.

FIG. 3 and FIG. 4 illustrate examples of data views 307, 402 and 405 operating within the graphical user interface or indexing engine 301 and 401. The data view is a single unified element, which has the capability to provide all the common and dynamic functionality involved in the display and maintenance of data and procedures. FIG. 3 also illustrates some of the features of a data view A1 307 operating within the indexing engine 301, such as: the data view title 308, a multi-record layout 311 and the attribute titles 309 above each data column 310.

Multiple data views may be opened and operating at the same time within the indexing engine. FIG. 4 illustrates multiple data views: A1 402 and C4 405 operating at the same time within the indexing engine 401. The total number of data views opened at the same time may be limited to computer memory on the client or on any of the supporting computer servers.

FIG. 2 illustrates the definition of two data views: A1 221 and C4 237 for Attribute Set I 205. When defining an exact data view, the data view is named 227 and 238 and assigned an attribute set 228 and 239, a user environment 229 and 240 and an access origin 230 and 241 along with the definition of the data view's dynamic functionality 231, 232, 233, 242, 243 and 244. The attribute set, user environment and access origins used to define a data view must be predefined and related to the data view 222, 223 and 224. The data view is programmed to have both common and dynamic functionality. The common functionality cannot be altered and is available to all data views within the data view matrix. However, dynamic functionality may be defined differently for any possible data view.

The definition of dynamic functionality for a data view involves several steps. The first step would be selecting the dynamic functionality 225 (Dynamic Functionality A through D) 231. Examples of dynamic functionality might be the data view position, data selection, data format, data sort, etc. Not all of the available dynamic functionality needs to be selected and defined for a data view definition. For example, only dynamic functionality A through D 231 is selected for data view A1 221. Next, the selected dynamic functionality must be defined for each data view, which will be referred to as the "dynamic functionality definitions" (DF Definitions A through D) 232.

For example, if a specific dynamic functionality defines the position of a data view within the indexing engine, the dynamic functionality definition would be the x-y coordinates. If the dynamic functionality definition requires procedures, a pre-defined component 204 might be selected and related 226 (Components E and F) 233 to a specific dynamic functionality definition 232. Another example illustrating the relationship between components and dynamic functionality is where a specific dynamic functionality, which performs data validation, may be defined by selecting a pre-defined component with the appropriate data validation procedure.

Not all data views must be defined exactly as illustrated in FIG. 2. There are multiple ways to define data views. FIG. 2 illustrates the definition of two exact data view definitions by selecting an modifier incident for all application dimensions. Some of the dynamic functionality may have default definitions either pre-defined or defined by the user, which can eliminate the need to define all dynamic functionality at runtime unless it is necessary to override the default definition. Data views may also be defined through a composite of partially defined data view definitions. A partial data view definition is where less than all of the application dimensions are defined with modifier incidents. For example, a partial data view definition may be defined for the access origin with the "customer master record" modifier incident where the dynamic functionality is defined to select only records for the customer from where the data view was initiated. This partial definition results in the selection of related data for the customer for all data views initiated from the customer master record. When the sales order data view is initiated from the customer master record, only sales orders relating to the customer will be selected, unless the dynamic functionality has an overriding definition from an exact data view definition. The combination of default dynamic functionality and partial data view definitions can produce the final functionality of a composite data view instance. The capability to define partial data view definitions with "underriding" and overriding capabilities makes it possible to define data views without having to define a data view for every modifier incident combination within the data view matrix 234.

The total number of possible data view definitions within an enterprise application is generally equal to the multiple of the application dimension modifier incidents (i.e. attribute sets, user environments and access origins). FIG. 2 illustrates an example of the total number of data views within an enterprise application where there are six attribute sets (I through VI) 211, five user environments (A through E) 213 and four access origins (1 through 4) 215 resulting in a total of 220 (6×4×5) possible exact data view definitions or data views within the enterprise application within the data view matrix 234.

This view of the data view matrix 234 illustrates a graphical understanding of all the possible ways in which this embodiment of the unified data view program may be dynamically altered. However, an exact or composite data view need not be defined for each and every possible data view within the data view matrix. For example, FIG. 2 illustrates the exact data view definition of only two data views, A1 221 and C4 237 for Attribute Set I 205 as they relate 235 and 236 to the data view matrix 234.

FIG. 2 illustrates how multiple data views may be exactly defined for the same attribute set where two data views A1 221 and C4 237 are defined for Attribute Set I 228 and 239, as represented by the front of the data view matrix 234, where data views A1 221 and C4 237 have different user environments 229 and 240, different access origins 230 and 241, different dynamic functionality selections 231 and 242, different dynamic functionality definitions 232 and 243 and different dynamic functionality components 233 and 244, even though the data views are within the same attribute set 228 and 239. One reason for multiple data views within the same attribute set is to provide the capability to define different dynamic functionality for each modifier incident combination from the application dimensions. Even though, the attributes may be the same for data views A1 221 and C4 237, the layout, data selected, data sort and functionality may differ significantly.

For example, suppose a data view is defined for an attribute set called "sales orders", a user environment called "Company Division", an access origin for an attribute called "Customer Name" and a certain dynamic functionality called "data selection" is defined to specifically select only sales order records for the customer value within the "Customer Name" attribute for the "Company Division" user environment. If this data view example is initiated by a user who resides within the "Atlanta Division" from the "Customer Name" attribute with a value of "Acme Chemical", the data view will select and display only the "Acme Chemical" sales orders for the "Atlanta Division" along with any other dynamic functionality definitions specific to this data view example when initiated from a "Customer Name" attribute.

The data view definitions can be performed using the indexing engine and can be stored on a computer storage device.

The application dimensions and the definition of dynamic functionality are combined together to orchestrate the fluid nature of all data views operating within the body of the present invention. This is how the present invention provides simplicity through the use of singular unified software while providing unlimited formats and functionality. The invention provides a unified data view program, which can be programmed with common and dynamic functionality. The unified data view program operating as a data view instance may dynamically change based on the dynamic functionality definitions for a defined data view that is derived from a combination of application dimension modifier incidents.

Indexing Engine

The main graphical user interface (GUI) of the present invention is referred to as the indexing engine. FIG. 3 illustrates an example of the indexing engine 301 operating on a computer with one data view instance 307 opened. FIG. 4 illustrates another example of the indexing engine 401 operating on a computer with two data view instances 402 and 405 opened at the same time. The indexing engine is a software device, which embodies and performs system activities. The indexing engine may reside in the memory of a computer client, computer server or multiple computer servers, or any combination of clients and servers depending on the computer system architecture where the present invention is operating. Multiple indexing engines may be operating at the same time within the system architecture where the present invention is operating.

One purpose of the indexing engine is to define, initiate, manage, organize, operate, and present data view instances. The indexing engine can also provide the capability to enter and maintain data or procedures within any open data view instance. The indexing engine can also initiate and manage any background processes required to support the activities of data and procedure maintenance for any open and active data view instance. The indexing engine may also provide other activities such as system, environment and application definition and administration.

FIG. 3 illustrates the minimum features of the indexing engine 301. These features are: the Title Bar 302, Menu Bar 303, Data View Area 304 and Activity Bar 305. These features may be closed at anytime and are not required to be open and visible for the indexing engine to operate. The title bar 302 can contain the indexing engine title and any other general information. The Menu Bar 303 can provide access to all of the appropriate activities required to define, develop, operate and support enterprise application development and enterprise applications. The data view area 304 is where all data views are displayed and accessed along with the possibility of any other activities required for the support of the development and application environments. The data view area 304 can also provide the capability to display and manage multiple data views at the same time. The activity bar 305 provides visibility and access to all data view instances open and active within the indexing engine 301. FIG. 3 further illustrates how the activity bar 305 indicates 306 that a data view instance 307 is open within the data view area 304. FIG. 4 illustrates two data view instances 402 and 405 open within the data view area and corresponding indicators 403 and 407 within the activity bar.

Multiple data view instances may be opened at the same time and may be interactively related within the indexing engine. FIG. 4 illustrates the operation of two data views 402 and 405 operating within the indexing engine 401. The same data views illustrated in FIG. 4 are the same data views defined in FIG. 2 as A1 221 and C4 237. As was discussed earlier, FIG. 2 illustrates two data view definitions A1 221 and C4 237, which are defined with the same attribute set 228 and 239, but with different dynamic functionality 231 and 242, different dynamic functionality definitions 232 and 243 and different dynamic functionality components 233 and 244. Because the dynamic functionality, definitions and components are defined differently within the two data view definitions, the layout and operation can vary between the two data view instances. FIG. 4 illustrates this variation; where data view instances A1 402 and C4 405 have different attributes and attribute arrangements 408 and 409, and also different data selection and data sorts 404 and 406 respectively. The two data view instances A1 402 and C4 405 have a multi-record layout 404 and 406. However, the multi-record layout is only one of many ways in which data within any particular data view instance may be arranged as based on the dynamic functionality definitions.

The indexing engine may be both an enterprise application environment as well as an enterprise application development environment. However, there is the possibility for the need to separate the enterprise application environment from the enterprise application development environment. Regardless of the separation between the enterprise application and the enterprise application development environments, the behavior and functionality of both environments can be the same. This is mainly due to the fact that the enterprise application development environment behaves and functions similarly to the enterprise application environment. Similar functionality exists in both environments. Therefore, the separation of these two environments should not deter from the embodiment of the invention since they both utilize the same elements of the invention. The actual background design, programming and system architecture of the indexing engine, dynamic functionality, and all the supporting processes may vary significantly but still conform to an embodiment of the present invention.

It is to be understood that the above-referenced arrangements are illustrative of the application for the principles of the present invention. Numerous modifications and alternative arrangements can be devised without departing from the spirit and scope of the present invention while the present invention has been shown in the drawings and described above in connection with the exemplary embodiments(s) of the invention. It will be apparent to those of ordinary skill in the art that numerous modifications can be made without departing from the principles and concepts of the invention as set forth in the claims.

What is claimed is:

1. In an enterprise-wide system capable of defining data views for numerous aspects of an enterprise's operations, a method of determining what data to display within a data view instance, and how such information should be displayed, by using a simplified definition scheme accounting for multiple independent dimensions, the method comprising:

receiving a request to display a data view instance, wherein the request is received from an access origin point within a graphical user interface;

in response to the user request, identifying at least three elements corresponding to the request, including:

an attribute set element corresponding to a set of data available for display within the data view instance;

a user environment element corresponding to information about the user making the request for display of the data view instance; and an access origin element corresponding to the access origin point from which the request to display the data view instance is received;

generating a data view definition for the data view instance, wherein generating the data view definition for the data view instance includes:

accessing, from a multidimensional model having at least three independent dimensions that include at least an attribute set dimension, a user environment dimension, and an access origin dimension, a separate data view definition for each of the attribute set element, the user environment element, and the access origin element;

combining and layering the data view definitions for each of the attribute set element, the user environment element, and the access origin element to form a data view definition for the data view instance and which corresponds to an intersection of the at least three independent dimensions at an instance corresponding to the attribute set element, the user environment set element, and the access origin element;

identifying dynamic functionality using the data view definition for the data view instance, wherein the dynamic functionality is functionality which is selectively available in the graphical user interface based on the intersection of the at least three independent dimensions; and creating the data view instance using a unified data view and the data view definition for the data view instance, wherein the unified data view defines dynamic functionality available for all data view instances definable by the multidimensional model; and presenting the data view instance within the graphical user interface.

2. The method of claim 1, wherein creating the data view instance includes combining components and data as defined by the data view definition.

3. The method of claim 1, wherein generating the data view definition comprises including common functionality in the data view definition for the data view instance, wherein common functionality is functionality which cannot be altered by a user of the enterprise application and which are provided in all data view instances.

4. The method of claim 1, wherein identifying the attribute set element includes selecting an attribute set element containing a group of data labels corresponding to columns of data selected, displayed, and accessible to a user within the data view instance.

5. The method of claim 1, wherein identifying the user environment element includes selecting a user environment set element having information regarding users who may access or request data view instances.

6. The method of claim 1, wherein identifying the access origin element includes selecting an access origin dimension representing the access origin point, which is a specific point within the graphical user interface, where a user may initiate the data view instance.

7. The method of claim 1, wherein generating the data view definition includes defining the data view definition using dynamic functionality definitions specific to only one of the data view definitions specific to the dimensions of the multidimensional model.

8. The method of claim 1, wherein the unified data view includes common functionality, such common functionality including non-user definable, static functionality configured for the layout and operation of the data view instance.

9. The method of claim 1, wherein generating the data view definition includes defining the dynamic functionality for the data view instance, and which includes all user definable features and characteristics in the unified data view program, wherein the dynamic functionality is dynamically activated, implemented, blocked, and modified as defined by the data view definition for the data view instance.

10. A computer-readable storage medium, having stored thereon, computer executable instructions that, when executed by a processor of a computing system, cause the computer system to perform a method of determining what data to display within a data view instance, and how such information should be displayed, by using a simplified definition scheme accounting for multiple independent dimensions, the method implemented comprising:
   receiving a request to display a data view instance, wherein the request is received from an access origin point within a graphical user interface;
   in response to the user request, identifying at least three elements corresponding to the request, including:
      an attribute set element corresponding to a set of data available for display within the data view instance;
      a user environment element corresponding to information about the user making the request for display of the data view instance; and
      an access origin element corresponding to the access origin point from which the request to display the data view instance is received;
   generating a data view definition for the data view instance, wherein generating the data view definition for the data view instance includes:
      accessing, from a multidimensional model having at least three independent dimensions that include at least an attribute set dimension, a user environment dimension, and an access origin dimension, a separate data view definition for each of the attribute set element, the user environment element, and the access origin element;
      combining and layering the data view definitions for each of the attribute set element, the user environment element, and the access origin element to form a data view definition for the data view instance and which corresponds to an intersection of the at least three independent dimensions at an instance corresponding to the attribute set element, the user environment set element, and the access origin element;
      identifying dynamic functionality using the data view definition for the data view instance, wherein the dynamic functionality is functionality which is selectively available in the graphical user interface based on the intersection of the at least three independent dimensions; and
      creating the data view instance using a unified data view and the data view definition for the data view instance, wherein the unified data view defines dynamic functionality available for all data view instances definable by the multidimensional model; and
   presenting the data view instance within the graphical user interface.

11. In an enterprise-wide system capable of defining data views for numerous aspects of an enterprise's operations, a method of displaying enterprise data within a data view instance presented within a graphical user interface, the data view instance being derived from a single unified view which defines data view dynamic functionality, and in a manner that simplifies data view definitions by defining potential dynamic functionality for multiple data views that share application dimensions, the method comprising:
   at a graphical user interface, receiving a user request to display a data view instance;
   determining an attribute set element corresponding to the user request, wherein the attribute set element defines a full set of data presentable at the requested data view instance;
   determining a user environment element corresponding to the user request, wherein the user environment element defines information about the user making the user request for the data view instance;
   determining an access origin element corresponding to the user request, wherein the access origin element defines an access origin point from which the user request is received in the graphical user interface;
   using the attribute set element, user environment element, and access origin element as independent dimensions, generating a data view definition for the data view instance, wherein generating the data view definition for the data view instance includes accessing a multidimensional model having independent dimensions, including an attribute set dimension, a user environment dimension, and an access origin dimension, and from within the multidimensional model;
   accessing a first data view definition, wherein the first data view definition is defined specifically for the attribute set element, the first data view definition defining a set of dynamic functionality for a data view corresponding to the first data view definition;
   accessing a second data view definition, wherein the second data view definition is defined specifically for the user environment element, the second data view definition defining a set of dynamic functionality for a data view corresponding to the second data view definition;
   accessing a third data view definition, wherein the third data view definition is defined specifically for the access origin element, the third data view definition defining a set of dynamic functionality for a data view corresponding to the third data view definition; and
   combining and layering the first data view definition, second data view definition, and third data view definition, thereby creating the data view definition for the data view instance that includes dynamic functionality determined by the first, second and third data view definitions, wherein elements of dynamic functionality are each functionality which is selectively available based on the requested data view instance being a specific intersection between the attribute set element, the user environment element, and the access origin element;

creating the data view instance corresponding to the user request, wherein creating the data view instance includes combining the data view definition for the data view instance with at least a partial copy of a universal data view, wherein the universal data view includes all dynamic functionality contained in all the data view definitions within the multidimensional model; and within the graphical user interface, presenting the data view instance corresponding to the user request.

12. In an enterprise-wide system capable of defining data views for numerous aspects of an enterprise's operations, a method of displaying enterprise data within a data view instance presented within a graphical user interface, the data view instance being derived from a single unified data view which defines data view dynamic functionality, and in a manner that simplifies data view definitions by defining potential dynamic functionality for multiple data views that share application dimensions, the method comprising:

at a graphical user interface within an enterprise application that provides both development and execution of enterprise applications, displaying a graphical user interface, wherein the enterprise application is linked to one or more databases storing information for a diverse set of applications and uses within an enterprise;

accessing a unified data view, wherein the unified data view provides a basis for all data views within the graphical user interface and is at least partially copied to generate each data view within the graphical user interface, and wherein the unified data view defines:

common functionality, wherein common functionality includes all data view features which cannot be altered by a user of the enterprise application and which are provided in all data view instances, such common functionality providing a consistent look and feel to each data view instance generated within the graphical user interface; and all potential dynamic functionality, wherein dynamic functionality is all functionality which is selectively available and excludable based on particular definitions for data view instances;

while displaying a first data view instance in the graphical user interface, receiving a user request to view a second data view instance, the user request being received via the first data view instance in the graphical user interface;

selecting independent application dimensions for determining how to display the second data view instance and what dynamic functionality to include in the second data view instance, the application dimensions including:

an attribute set dimension, wherein the attribute set dimension defines what columns of data are available for presentation in a particular data view instance;

a user environment dimension, wherein the user environment dimension corresponds to descriptive information about a user requesting the particular data view instance; and an access origin dimension, wherein the access origin dimension includes an access origin point of a data view instance from which the particular data view instance is requested;

using a multidimensional model having the attribute set dimension, user environment dimension, and access origin dimension as at least three independent dimensions within the multidimensional model, generating a data view definition particular to the second data view instance, which data view definition defines a look and feel of the requested second data view instance, wherein generating the data view definition particular to the second data view instance includes identifying a specific intersection between each of the attribute set dimension, the user environment dimension, and the access origin dimension corresponding to the second data view instance, and combining and layering the each such dimension's data view definition, such that inasmuch as the attribute data set defines what set of data is available for presentation at the second data view instance, the set of available data is only one dimension in the multidimensional model;

identifying dynamic functionality using the data view definition for the second data view instance, wherein the dynamic functionality includes all functionality which is selectively available based on the specific intersection between the attribute set dimension, user environment dimension, and access origin dimension corresponding to the second data view instance;

creating the second data view instance by using the unified data view, and activating the dynamic functionality defined in the unified data view based on which dynamic functionality is identified for the data view definition for the second data view instance; and presenting the second data view instance within the graphical user interface, the second data view instance including all common functionality defined in the unified data view and including a subset of all potential dynamic functionality, the subset being the dynamic functionality identified using the data view definition for the second data view and which are activated.

* * * * *